US00RE39946E

(19) United States
(12) Reissued Patent
Blok et al.

(10) Patent Number: US RE39,946 E
(45) Date of Reissued Patent: Dec. 25, 2007

(54) CONDUCTIVE POLYMER COMPOSITIONS CONTAINING N-N-M-PHENYLENEDIMALEIMIDE AND DEVICES

(75) Inventors: Edward J. Blok, Wadsworth, OH (US); Prasad Khadkikar, Seville, OH (US)

(73) Assignee: Therm-O-Disc, Incorporated, Mansfield, OH (US)

(21) Appl. No.: 10/128,106

(22) Filed: Apr. 23, 2002

Related U.S. Patent Documents

Reissue of:

(64) Patent No.: 6,274,852
Issued: Aug. 14, 2001
Appl. No.: 09/686,227
Filed: Oct. 11, 2000

(51) Int. Cl.
*H05B 1/02* (2006.01)

(52) U.S. Cl. ..... 219/505; 219/504; 219/528; 252/511; 252/512; 338/225 D

(58) Field of Classification Search ..... 219/505, 219/504, 528, 494; 338/22 R, 225 D; 252/521.3, 252/511–513

See application file for complete search history.

(56) References Cited

U.S. PATENT DOCUMENTS 3,760,495 A * 9/1973 Meyer ..... 29/610
4,520,260 A * 5/1985 Kotian ..... 219/553
5,580,493 A * 12/1996 Chu et al.
5,582,770 A * 12/1996 Chu et al.
5,837,164 A * 11/1998 Zhao
5,965,049 A * 10/1999 Carlet ..... 219/505
5,985,182 A * 11/1999 Zhao
6,104,274 A * 8/2000 Matsuda et al. ..... 338/22 R
6,114,942 A * 9/2000 Kitamoto et al. ..... 338/22 R

* cited by examiner

*Primary Examiner*—Mark Paschall
(74) *Attorney, Agent, or Firm*—Harness, Dickey & Pierce, P.L.C.

(57) ABSTRACT

The invention provides polymeric PTC compositions and electrical PTC devices with a high voltage capability and improved electrical stability. The polymeric PTC compositions are readily blended and generally do not require cross-linking, particularly radiation induced cross-linking in order to manufacture useful products.

29 Claims, 1 Drawing Sheet

CONDUCTIVE POLYMER COMPOSITIONS CONTAINING N-N-M-PHENYLENEDIMALEIMIDE AND DEVICES

Matter enclosed in heavy brackets [ ] appears in the original patent but forms no part of this reissue specification; matter printed in italics indicates the additions made by reissue.

BACKGROUND OF THE INVENTION

The invention relates generally to polymeric positive temperature coefficient (PTC) compositions and electrical PTC devices. In particular, the invention relates to polymeric PTC compositions containing N-N-m phenylenedimaleimide which exhibit improved over voltage capabilities and an enhanced PTC effect.

Electrical devices comprising conductive polymeric compositions that exhibit a PTC effect are well known in electronic industries and have many applications, including their use as constant temperature heaters, thermal sensors, low power circuit protectors and over current regulators for appliances and live voltage applications, by way of non-limiting example. A typical conductive polymeric PTC composition comprises a matrix of a crystalline or semi-crystalline thermoplastic resin (e.g., polyethylene) or an amorphous thermoset resin (e.g., epoxy resin) containing a dispersion of a conductive filler, such as carbon black, graphite chopped fibers, nickel particles or silver flakes. Some compositions additionally contain flame retardants, stabilizers, antioxidants, antiozonants, accelerators, pigments, foaming agents, crosslinking agents, dispersing agents and inert fillers.

At a low temperature (e.g. room temperature), the polymeric PTC structure provides a conducting path for an electrical current, presenting low resistivity. However, when a PTC device comprising the composition is heated or an over current causes the device to self-heat to a transition temperature, a less ordered polymer structure resulting from a large thermal expansion presents a high resistivity. In electrical PTC devices, for example, this resistivity limits the load current, leading to circuit shut off. In the context of this invention $T_s$ is used to denote the "switching" temperature at which the "PTC effect" (a rapid increase in resistivity) takes place. The sharpness of the resistivity change as plotted on a resistance versus temperature curve is denoted as "squareness", i.e., the more vertical the curve at the $T_s$, the smaller is the temperature range over which the resistivity changes from the low to the maximum values. When the device is cooled to the low temperature value, the resistivity will theoretically return to its previous value. However, in practice, the low-temperature resistivity of the polymeric PTC composition may progressively increase as the number of low-high-low temperature cycles increases, an electrical instability effect. To address this so-called ratcheting effect, often the conductive polymers have been cross linked via irradiation techniques to improve electrical stability. Other attempts at improving the electrical stability of the polymeric PTC composition have involved chemical cross linking or the crosslinking of a conductive polymer by chemicals or irradiation, or the addition of inert fillers or organic additives.

In the preparation of the conductive PTC polymeric compositions, the processing temperature often exceeds the melting point of the polymer by 20° C. or more, with the result that the polymers may undergo some decomposition or oxidation during the forming process. In addition, some devices exhibit thermal instability at high temperatures and/or high voltages that may result in aging of the polymer. Thus, inert fillers and/or antioxidants, etc. may be employed to provide thermal stability.

Among the known inert fillers employed in PTC polymeric compositions are polymeric powders such as polytetrafluoroethylene (e.g., Teflon™ powder), polyethylene and other plastic powders, fumed silica, calcium carbonate, magnesium carbonate, aluminum hydroxide, kaolin, talc, chopped glass or continuous glass, fiberglass and fibers such as Kelvar™ polyaramide fiber (available from DuPont) among others. According to U.S. Pat. No. 4,833,305 by Machino et al., the fibers employed preferably have an aspect ratio of approximately 100 to 3500, a diameter of at least approximately 0.05 microns and a length of at least approximately 20 microns.

Polymeric PTC materials have found a variety of applications, such as self-regulating heaters and self-resettable sensors to protect equipment from damage caused by over-temperature or over-current surge. For circuit protection, the polymeric PTC devices are normally required to have the ability to self-reset, to have a low resistivity at 25° C. (10 Ωcm or less), and to have a moderately high PTC effect ($10^3$ or higher) in order to withstand a direct current (DC) voltage of 16 to 20 volts. Polyolefins, particularly polyethylene (PE)-based conductive materials, have been widely explored and employed in these low DC voltage applications.

Polymeric PTC sensor devices that are capable of operating at much higher voltages, such as the 240 alternating current voltages (VAC) ("Line" voltages) present in AC electrical lines. Such polymeric PTC devices have been found to be particularly useful as self-resettable sensors to protect AC motors from damage caused by over-temperature or over-current surge. For example, and without limitation, such high voltage capacity polymeric PTC devices would be useful to protect the motors of household appliances, such as dishwashers, washers, refrigerators and the like.

In view of the foregoing, there is a need for the development of polymeric PTC compositions and devices comprising them that exhibit a high PTC effect, have a low initial resistivity, that exhibit substantial electrical and thermal stability, and that are capable of use over a broad voltage range, i.e., from about 6 volts to about 300 volts.

SUMMARY OF THE INVENTION

The invention provides polymeric PTC compositions and electrical PTC devices having increased voltage capabilities while maintaining a low RT resistance. In particular, the polymeric compositions also demonstrate a high PTC effect (the resistivity at the $T_s$ is at least $10^4$ times the resistivity at 25° C.) and a low initial resistivity at 25° C. (preferably 10 Ωcm or less, more preferably 5 mΩ or less). The electrical PTC devices comprising these polymeric PTC compositions preferably have a resistance at 25° C. of 500 mΩ or less (preferably about 5 mΩ to about 500 mΩ, more preferably about 7.5 mΩ to about 200 mΩ, typically about 10 mΩ to about 100 mΩ) with a desirable design geometry.

The polymeric PTC compositions of the invention, demonstrating the above characteristics, comprise an organic polymer, a particulate conductive filler, an inert filler, an organic stabilizer including N-N-m phenylenedimaleimide and, optionally, an additive selected from the group consisting of inorganic stabilizes, flame retardants, antioxidants, antiozonants, accelerators, pigments, foaming agents, crosslinking agents and dispersing agents. The compositions may or may not be crosslinked to improve electrical stability before or after their use in the electrical PTC devices of the invention.

The electrical PTC devices of the invention have, for example, the high voltage capability to protect equipment operating on Line current voltages from over-heating and/or over-current surges. The devices are particularly to useful as self-resetting sensors for AC motors, such as those of household appliances, such as dishwashers, washers, refrigerators and the like. Additionally, PTC compositions for use in low voltage devices such as batteries, actuators, disk drives, test equipment and automotive applications are also described below.

DETAILED DESCRIPTION OF THE INVENTION

Figure 1:
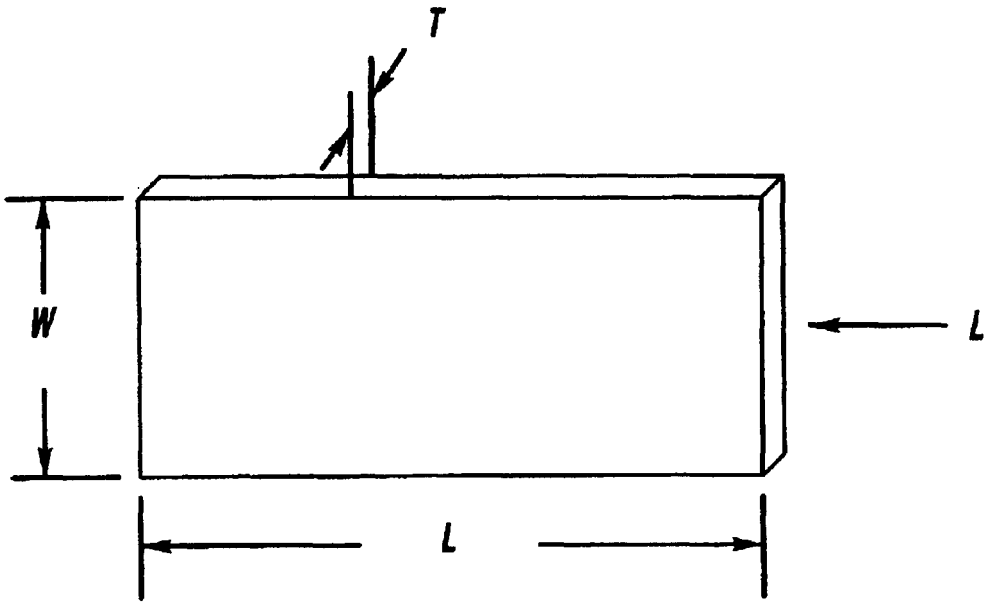
FIG. 1 is a schematic illustration of a PTC chip comprising the polymeric PTC composition of the invention sandwiched between two metal electrodes.

The PTC polymeric composition of the present invention comprises an organic polymer, a particulate conductive filler, an organic stabilizer including N-N-m phenylenedimaleimide and, optionally, an additive selected from the group consisting of flame retardants, inert fillers, inorganic stabilizers, antioxidants, antiozonants, accelerators, pigments, foaming agents, crosslinking agents, coupling agents, co-agents and dispersing agents. While not specifically limited to high voltage applications, for purposes of conveying the concepts of the present invention, PTC devices employing the novel PTC polymeric compositions will generally be described with reference to high voltage embodiments. The criteria for a high voltage capacity polymeric composition are (i) a high PTC effect, (ii) a low initial resistivity at 250° C., and (iii) the capability of withstanding a voltage of 110 to 240 VAC or greater while maintaining electrical and thermal stability. As used herein, the term "high PTC effect" refers to a composition resistivity at the $T_s$ that is $10^3$ times the composition resistivity at room temperature (for convenience, 25° C.). There is no particular requirement as to the temperature at which the composition switches to its higher resistivity state. That is, the magnitude of the PTC effect has been found to be more important than the $T_s$.

As used here, the term "low initial resistivity" refers to an initial composition resistivity at 25° C. of 100 Ωcm or less, preferably 10 Ωcm or less, more preferably 5 Ωcm or less, especially 2 Ωcm or less, thus providing for a PTC device having a low resistance at 25° C. of about 500 Ωor less, preferably about 5 Ωto 500 mΩ, more preferably about 7.5 mΩ to about 10 mΩ to about 200 mΩ, typically about 10 mΩ to about 100 mΩ, with an appropriate geometric design and size, as discussed further below.

The organic polymer component of the composition of the present invention is generally selected from a crystalline organic polymer, an amorphous thermoplastic polymer (such as polycarbonate or polystyrene), an elastomer (such as polybutadiene or ethylene/propylene/diene (EPDM) polymer) or a blend comprising at least one of these. Suitable crystalline polymers include polymers of one or more olefins, particularly polyethylene; copolymers of at least one olefin and at least one monomer copolymerisable therewith such as ethylene acrylic acid, ethylene ethyl acrylate and ethylene vinyl acetate; melt shapeable fluoropolymers such as polyvinylidene fluoride and ethylene tetrafluoroethylene and blends of two or more such crystalline polymers.

It is known that the $T_s$ of a conductive polymeric composition is generally slightly below the melting point ($T_m$) of the polymeric matrix. If the thermal expansion coefficient of the polymer is sufficiently high near the $T_m$, a high PTC effect may occur. Further, it is known that the greater the crystallinity of the polymer, the smaller the temperature range over which the rapid rise in resistivity occurs. Thus, crystalline polymers exhibit more "squareness", or electrical stability, in a resistivity versus temperature curve.

The preferred crystalline or semi-crystalline polymer component in the conductive polymeric composition of the present invention has a crystallinity in the range of 20% to 99%, and preferably 40% to 99%. In order to achieve a composition with a high PTC effect, it is preferable that the polymer has a melting point ($T_m$) in the temperature range of 60° C. to 300° C. Preferably, the polymer substantially withstands decomposition at a processing temperature that is at least 20° C. and preferably less than 120° C. above the $T_m$.

The crystalline or semi-crystalline polymer component of the conductive polymeric composition of the invention may also comprise a polymer blend containing, in addition to the first polymer, between about 0.5 to 50.0% of a second crystalline or semi-crystalline polymer based on the total polymeric component. The second crystalline or semi-crystalline polymer is preferably a polyolefin-based or polyester-based thermoplastic elastomer.

The particulate electrically conductive filler may comprise carbon black, graphite, metal particles, or a combination of these. Metal particles may include, but are not limited to, nickel particles, silver flakes, or particles of tungsten, molybdenum, gold platinum, iron, aluminum, copper, tantalum, zinc, cobalt, chromium, lead, titanium, tin alloys or mixtures of the foregoing. Such metal fillers for use in conductive polymeric compositions are known in the art.

The inert filler component comprises inert fibers such as continuous and chopped fibers including, by way of non-limiting example, fiberglass and polyamide fibers such as Kevlar (available from DuPont). Such fibers may be randomly oriented or may be specifically oriented to improve the anisotropic behavior. The total amount of fibers employed will generally range from between about 0.25 phr to about 50.0 phr and, preferably, from about 0.5 phr to about 10.0 phr. It should be understood that "phr" means parts per 100.0 parts of the organic polymer component.

Inert fillers may also be employed including, but not limited to, amorphous polymeric powders such as silicon, nylons, fumed silica, calcium carbonate, magnesium carbonate, aluminum hydroxide, kaolin clay, barium sulphate, talc, chopped glass or continuous glass. Additionally, fibrillated fibers may also be employed as described in co-pending U.S. patent application Ser. No. 09/588,337, the disclosure of which is hereby incorporated by reference. The inert filler component ranges from 1.0 phr to about 100.0 phr and, preferably, from 3.0 phr to about 15.0 phr.

In addition to the crystalline or semi-crystalline polymer component, the particulate conductive filler and the inert filler, the conductive polymeric composition includes an organic stabilizer component including N-N-m phenylenedimaleimide. The organic stabilizer component serves the dual function of providing a certain degree of electrical stability as well as reducing the need for cross linking the polymeric component via irradiation.

Additives to further enhance electrical, mechanical, and thermal stability may also be employed. Suitable inorganic additives for electrical and mechanical stability include metal oxides, such as magnesium oxide, zinc oxide, aluminum oxide, titanium oxide, or other materials, such as calcium carbonate, magnesium carbonate, alumina trihydrate, and magnesium oxide, or mixtures of any of the foregoing. Organic antioxidants may be optionally added to the composition to increase the thermal stability. In most cases, these are either phenol or aromatic amine type heat stabilizers, such as N,N'-1,6-hexanediylbis (3,5-bis (1,1-dimethylethyl)-4-hydroxy-benzene) propanamide (Irganox-1098, available from Ciba-Geigy Corp., Hawthorne, N.Y.), N-stearoyl-4-aminophenol, N-lauroyl-4-aminophenol, and polymerized 1,2-dihydro-2,2,4-trimethyl quinoline. The proportion by weight of the organic antioxidant agent in the composition may range from 0.1 phr to 15.0 phr and, preferably 0.5 phr to 7.5 phr. The conductive polymeric composition may also comprise other inert fillers, nucleating agents, antiozonants, fire retardants, inorganic stabilizers, dispersing agents or other components.

Figure 2:
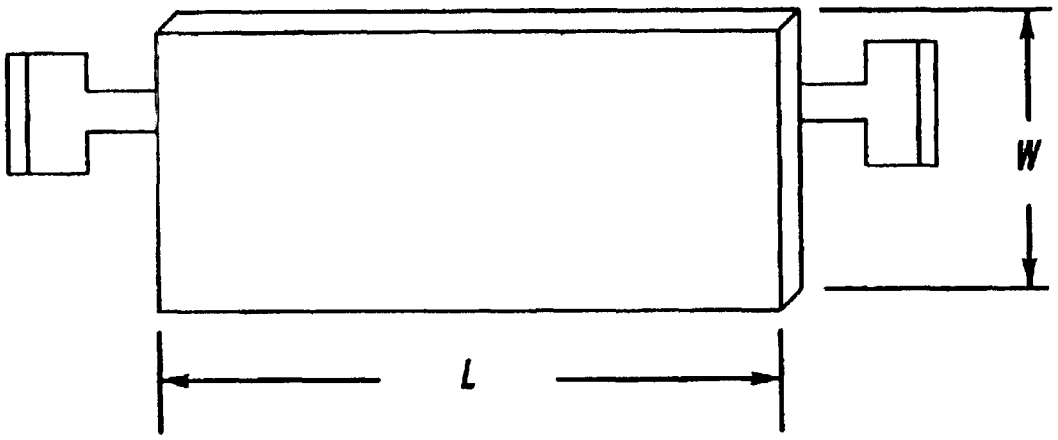
FIG. 2 is a schematic illustration of an embodiment of a PTC device according to the invention, comprising the PTC chip of FIG. 1 with two attached terminals.

In an embodiment of the invention, the high temperature PTC device of the invention comprises a PTC "chip" 1 illustrated in FIG. 1 and electrical terminals 12 and 14, as described below and schematically illustrated in FIG. 2. As shown in FIG. 1, the PTC chip 1 comprises the conductive polymeric composition 2 of the invention sandwiched between metal electrodes 3. The electrodes 3 and the PTC chip 2 are preferably arranged so that the current flows over an area L×W of the chip 1 that has a thickness, T, such that W/T is at least 2, preferably at least 5, especially at least 10. The electrical resistance of the chip or PTC device also depends on the thickness and the dimensions W and L, and T may be varied in order to achieve a preferable resistance, described below. For example, a typical PTC chip generally has a thickness of 0.05 to 5 millimeters (mm), preferably 0.1 to 2.0 mm, and more preferably, 0.2 to 1.0 mm. The general shape of the chip/device may be that of the illustrated embodiment or may be of any shape with dimensions that achieve the preferred resistance.

It is generally preferred to use two planar electrodes of the same area which are placed opposite to each other on either side of a flat PTC polymeric composition of constant thickness. The material for the electrodes is not specially limited, and can be selected from silver, copper, nickel, aluminum, gold and the like. The material can also be selected from combinations of these metals, nickel-plated copper, tin-plated copper, and the like. The electrodes are preferably used in a sheet form. The thickness of the sheet is generally less than 1 mm, preferably less than 0.5 mm, and more preferably less than 0.1 mm.

The high temperature PTC device manufacture by compression molding or by extrusion/lamination, as described below, and containing a crosslinked composition demonstrates electrical stability. As termed herein, a device demonstrating "electrical stability" has an initial resistance $R_o$ at 25° C. and a resistance $R_x$ at 25° C. after X cycles to the switching temperature and back to 25° C., wherein the value of the ratio $(R_x-R_o)/R_o$, which is the ratio of the increase in resistance after X temperature excursion, to the initial resistance at 25° C. Generally speaking, the lower the valve, the more stable the composition.

The conductive polymeric compositions of the invention are prepared by methods known in the art. In general, the polymer or polymer blend, the conductive filler, the inert filler including fibrillated fibers and additives (if appropriate) are compounded at a temperature that is at least 20° C. higher, but no more than 120° C. higher, than the melting temperature of the polymer or polymer blend. The compounding temperature is determined by the flow property of the compounds. After compounding, the homogeneous composition may be obtained in any form, such as pellets. The composition is then subjected to a hot-press or extrusion/lamination process and transformed into a thin PTC sheet.

To manufacture PTC sheets by extrusion, process parameters such as the temperature profile, head pressure, RPM, and the extruder screw design are important in controlling the PTC properties of resulting PTC sheet. Generally, the higher the filler content, the higher is the processing temperature used to maintain the head pressure. A screw with a straight-through design is preferred in the manufacture of PTC sheets. Because this screw design provides low shear force and mechanical energy during the process, the possibility of breaking down the carbon black aggregates is reduced, resulting in PTC sheets having low resistivity. The thickness of the extruded sheets is generally controlled by the die gap and the gap between the laminator rollers. During the extrusion process, metallic electrodes in the form of metal foil covering both the top and bottom of a layer of the polymer compound, are laminated to the composition.

PTC sheets obtained, e.g., by compression molding, transfer molding or injection molding or extrusion, are then cut to obtain PTC chips having predetermined dimensions and comprising the conductive polymeric composition sandwiched between the metal electrodes. Electrical terminals are then soldered to each individual chip to form PTC electrical devices.

The following examples illustrate embodiments of the high voltage capacity conductive polymeric PTC compositions and electrical PTC devices of the invention. However, these embodiments are not intended to be limiting, as other methods of preparing the compositions and devices e.g., injection molding, to achieve desired electrical and thermal properties may be utilized by those skilled in the art. The compositions, PTC chips and PTC devices were tested for PTC properties directly by an overvoltage test and cycle test, as described below. The number of samples tested from each batch of chips is indicated below and the results of the testing reported in Tables 1 and 2. The resistance of the PTC chips and devices is measured, using a four-wire standard method, with a micro-ohmmeter (e.g., Keithley 580, Keithley Instruments, Cleveland, Ohio) having an accuracy of ±0.01 MΩ.

The cycle test is performed in a manner similar to the switching test, except that the switching parameters (voltage and amperage) remain constant during a specified number of switching cycle excursions from −40° C. to the $T_s$ and back to −40° C. The resistance of the device is measured at 25° C. before and after a specified number of cycles. The initial resistance at 25° C. is designated $R_o$ and the resistance after X numbers of cycles is designated $R_x$, e.g. $R_{100}$. The resistance increase ratio is $(R_x-R_o)/R_o$.

The cycling test is a way to evaluate the electrical stability of the polymeric PTC devices. The test is conducted at −40° C. for 1000 cycles. The devices are switched at 30 volts and 6.2 amps. The cycle consists at 2 minutes in the switched state with one minute intervals between cycles at −40° C. The resistance of the device is measured before and after the cycling.

As reflected below, the overvoltage testing is conducted by a stepwise increase in the voltage starting at 5 volts.

EXAMPLES

Example 1

N-N-m-phenylenedimaleimide was evaluated in Example 1. Controls A and B demonstrate the standard approach of reducing the carbon black content to increase voltage capability. Examples 2 and 3 are compounds containing other multifunctional chemicals.

Using the formulas shown in Table 1, the compounds were mixed for 15 minutes at 180° C. in a 30 ml brabender internal mixer. The compounds were then placed between nickel coated copper foil and compression molded at 10 tons for 15 minutes at 190° C. The sheet of PTC material was then cut into 11 by 20 mm chips and dip soldered to attach leads.

TABLE 1

Formulations (based on phr)

| | Control A | Control B | Example 1 | Example 2 | Example 3 |
|---|---|---|---|---|---|
| HDPF | 100 | 100 | 100 | 100 | 100 |
| Carbon Black N550 | 75 | 65 | 75 | 75 | 75 |
| MgO | 6 | 6 | 6 | 6 | 6 |
| Agerite MA | 3 | 3 | 3 | 3 | 3 |
| N-N-m-phenylene-dimaleimide | 0 | 0 | 3 | 0 | 0 |
| Trimethylol-propane trimethacrylate | 0 | 0 | 0 | 3 | 0 |
| Trimethylol-propane triacrylate | 0 | 0 | 0 | 0 | 3 |

TABLE 2

Properties of PTC Compounds (no irradiation)

| | Control A | Control B | Example 1 | Example 2 | Example 3 |
|---|---|---|---|---|---|
| Voltage capability | | | | | |
| Device thickness | .0224 | .0233 | .0237 | .207 | .0219 |
| Device resistance mOhms (RT) | 35.3 | 66.7 | 67.5 | 36 | 34.9 |
| Voltage capability (DC) | 98 | 170 | >300 | 75 | 40 |
| Resistance stability | | | | | |
| Device thickness | .0208 | 0.207 | .0204 | .0236 | .0233 |
| Device resistance mOhms (RT) | 35.3 | 52.9 | 51.4 | 38.0 | 38.6 |
| Cold cycling (−40° C.) % increase after 1000 cycles | 464 | 1859 | 127 | 2558 | 6655 |

As can be seen from the data presented above, a major advantage of N-N-m-phenylenedimaleimide is the ability to manufacture a polymeric PTC device with outstanding electrical stability without a crosslinking step.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

We claim:

1. A polymeric PTC composition comprising an organic polymer, a particulate conductive filler; an organic stabilizer including N-N-m phenylenedimaleimide and, optionally, one or more additives selected from the group consisting of inert fillers, flame retardants, stabilizers, antioxidants, antiozonants, accelerators, pigments, foaming agents, crosslinking agents, coupling agents, co-agents and dispersing agents.

2. The composition of claim 1 wherein said organic stabilizer is present in an amount of between about 0.5 to about 15.0 based on the total composition.

3. The composition of claim 1 wherein said organic stabilizer is present in an amount of between about 1.0 to about 5.0 based on the total composition.

4. The composition of claim 1 wherein the particulate conductive filler is selected from the group consisting of carbon black, graphite, metal particles, and mixtures thereof.

5. The composition of claim 4 wherein the metal particles are selected from the group consisting of nickel particles, silver flakes, or particles of tungsten, molybdenum, gold, platinum, iron, aluminum, copper, tantalum, zinc, cobalt, chromium, lead, titanium, tin alloys, and mixtures thereof.

6. The composition of claim 1 wherein the [inorganic] stabilizers are selected from the group consisting of magnesium oxide, zinc oxide, aluminum oxide, titanium oxide, calcium carbonate, magnesium carbonate, alumina trihydrate, magnesium hydroxide, and mixtures thereof.

7. The composition of claim 1 wherein the antioxidant comprises a phenol or an aromatic amine.

8. The composition of claim 7, wherein the antioxidant is selected from the group consisting of N,N'-1,6-hexanediylbis (3,5-bis (1,1-dimethylethyl)-4-hydroxybenzene) propanamide, [(]N-stearoyl-4-aminophenol, N-lauroyl-4-aminophenol, polymerized 1,2-dihydro-2,2,4-trimethyl quinoline, and mixtures thereof.

9. The composition of claim 1 wherein said particulate conductive filler is present in an amount of between about 15.0 phr to 250.0 phr.

10. The composition of claim 1 wherein said particulate conductive filler is present in an amount of between about 60.0 phr to 180.0 phr.

11. The composition of claim 1, wherein the polymeric PTC composition is crosslinked with the aid of a chemical agent or by irradiation.

12. The composition of claim 1 wherein the organic polymer has a melting temperature $T_m$ of about 60° C. to about 300° C.

13. The composition of claim 1, further comprising between about 0.5% to 50.0% of a second crystalline or semi-crystalline polymer based on the total organic polymer component.

14. The composition of claim 13, wherein the second polymer is selected from a polyolefin thermoplastic elastomer, a polyester thermoplastic elastomer, and mixtures and copolymers thereof.

15. An electrical device which exhibits PTC behavior, comprising:

(a) a conductive polymeric composition that comprises an organic polymer component including [perhydrotriphenylene] *N-N-m-phenylenedimaleimide*, a particulate conductive filler, and, optionally, one or more additives selected from the group consisting of inert fillers, flame retardants, stabilizers, antioxidants, antiozonants, accelerators, pigments, foaming agents, crosslinking agents and dispersing agents, the composition having a resistivity at 25° C. of 100 Ωcm or less[, the composition having a resistivity at 25° C. of 100 Ωcm or less] and a resistivity at its switching temperature that is at least $10^3$ times the resistivity at 25° C.; and (b) at least two electrodes which are in electrical contact with the conductive polymeric composition to allow a DC or an AC current to pass through the composition under an applied voltage, wherein the device has a resistance at 25° C. of 500 mΩ or less with a desirable design geometry.

16. The device of claim 15 wherein the device has a resistance at 25° C. of about 5.0 mΩ to about 400 mΩ.

17. The device of claim 16 wherein the device has a resistance at 25° C. of about 10 mΩ to about 100 mΩ.

18. The composition of claim 15 wherein said inert filler is present in an amount of between about 0.25 phr to 50.0 phr.

19. The composition of claim 15 wherein said inert filler is present in an amount of between about 0.5 phr to 10.0 phr.

20. The composition of claim 15 wherein the particulate conductive filler is selected from the group consisting of carbon black, graphite, metal particles, and mixtures thereof.

21. The composition of claim 20 wherein the metal particles are selected from the group consisting of nickel particles, silver flakes, or particles of tungsten, molybdenum, gold, platinum, iron, aluminum, copper, tantalum, zinc, cobalt, chromium, lead, titanium, tin alloys, and mixtures thereof.

22. The composition of claim 15 wherein the [inorganic] stabilizers are selected from the group consisting of magnesium oxide, zinc oxide, aluminum oxide, titanium oxide, calcium carbonate, magnesium carbonate, alumina trihydrate, magnesium hydroxide, and mixtures thereof.

23. The composition of claim 15, wherein the antioxidant is selected from the group consisting of N,N'-1,6-hexanediylbis (3,5-bis (1,1-dimethylethyl)-4-hydroxybenzene) propanamide, [(]N-stearoyl-4-aminophenol, N-lauroyl-4-aminophenol, polymerized 1,2-dihydro-2,2,4-trimethyl quinoline, and mixtures thereof.

24. The composition of claim 15 wherein said particulate conductive filler is present in an amount of between about 15.0 phr to 250.0 phr.

25. The composition of claim 15 wherein said particulate conductive filler is present in an amount of between about 60.0 phr to 180.0 phr.

26. The composition of claim 15, wherein the polymeric PTC composition is crosslinked with the aid of a chemical agent or by irradiation.

27. The composition of claim 15 wherein the organic polymer has a melting temperature $T_m$ of about 60° C. to about 300° C.

28. The composition of claim 15, further comprising between about 0.5% to 50.0% of a second crystalline or semi-crystalline polymer based on the total organic polymer component.

29. The composition of claim 28, wherein the second polymer is selected from a polyolefin thermoplastic elastomer, a polyester thermoplastic elastomer, and mixtures and copolymers thereof.

* * * * *